US012592842B2

(12) United States Patent
Muñoz De La Torre Alonso et al.

(10) Patent No.: US 12,592,842 B2
(45) Date of Patent: Mar. 31, 2026

(54) METHODS SUPPORTING USAGE REPORTING RULES WITH AND WITHOUT ASSOCIATED REPORTING RULES AND RELATED NETWORK NODES

(71) Applicant: Telefonaktiebolaget LM Ericsson (publ), Stockholm (SE)

(72) Inventors: Miguel Angel Muñoz De La Torre Alonso, Madrid (ES); Rodrigo Alvarez Dominguez, Madrid (ES); Carlos Jimenez Cordon, Madrid (ES); Erik Wikström, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 447 days.

(21) Appl. No.: 18/027,424

(22) PCT Filed: Nov. 25, 2020

(86) PCT No.: PCT/IB2020/061159
§ 371 (c)(1),
(2) Date: Mar. 21, 2023

(87) PCT Pub. No.: WO2022/064269
PCT Pub. Date: Mar. 31, 2022

(65) Prior Publication Data
US 2023/0336369 A1     Oct. 19, 2023

(30) Foreign Application Priority Data
Sep. 24, 2020    (EP) ..................................... 20382842

(51) Int. Cl.
*H04L 12/14*          (2024.01)
*H04M 15/00*          (2006.01)
(Continued)

(52) U.S. Cl.
CPC ........ *H04L 12/1407* (2013.01); *H04M 15/61* (2013.01); *H04W 76/11* (2018.02); *H04W 4/24* (2013.01)

(58) Field of Classification Search
CPC .. H04L 12/1407; H04L 67/141; H04M 15/61; H04M 15/41; H04M 15/58;
(Continued)

(56) References Cited

U.S. PATENT DOCUMENTS

| | | | |
|---|---|---|---|
| 10,412,625 B1 * | 9/2019 | Yan | H04L 47/32 |
| 2020/0214054 A1 * | 7/2020 | Qiao | H04M 15/8228 |
| 2022/0345887 A1 * | 10/2022 | Karampatsis | H04L 67/306 |

FOREIGN PATENT DOCUMENTS

| | | |
|---|---|---|
| WO | 2019238252 A1 | 12/2019 |
| WO | 2020083515 A1 | 4/2020 |

OTHER PUBLICATIONS

PCT International Search Report and Written Opinion for International Application No. PCT/IB2020/061159 mailed Jun. 21, 2021, 13 pages.
(Continued)

*Primary Examiner* — Obaidul Huq
(74) *Attorney, Agent, or Firm* — Sage Patent Group

(57) ABSTRACT

A method of operating a core network CN node is disclosed. A plurality of PCC rules are received corresponding to a plurality of applications used by a communication device. Each of the applications has a respective appID, and each of the PCC rules is associated with a respective application/appID. A first information element is generated based on a first PCC rule associated with a respective first application/appID including a first URR having a first URR Identifier and including first URR parameters associated with the first URR. A second information element is generated based on a second PCC rule associated with a respective second application/appID including a second URR having a second
(Continued)

URR identifier without including second URR parameters associated with the second URR. A session establishment request message is transmitted to a second CN node. The session establishment request message includes the first and second information elements.

20 Claims, 11 Drawing Sheets

(51) Int. Cl.
  *H04W 76/11* (2018.01)
  *H04W 4/24* (2018.01)

(58) Field of Classification Search
  CPC .... H04M 15/62; H04M 15/66; H04M 15/775;
  H04W 76/11; H04W 4/24; H04W 76/12

USPC ......................................................... 370/259
  See application file for complete search history.

(56) References Cited

OTHER PUBLICATIONS

3GPP, Technical Specification Group Core Network and Terminals; Interface between the Control Plane and the User Plane Nodes, Stage 3 (Release 16), 3GPP TS 29.244 V16.3.1 (Apr. 2020), 297 pages.
3GPP, Technical Specification Group Core Network and Terminals; Interface between the Control Plane and the User Plane Nodes, Stage 3 (Release 15), 3GPP TS 29.244 V15.3.0 (Sep. 2018), 189 pages.

* cited by examiner

Figure 9
Figure 10
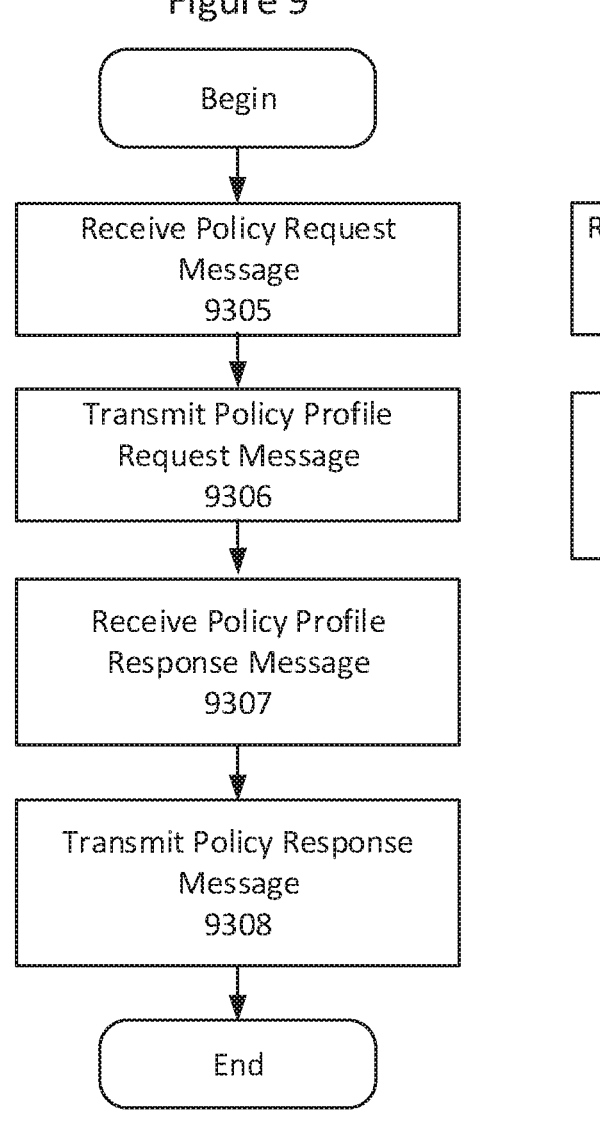
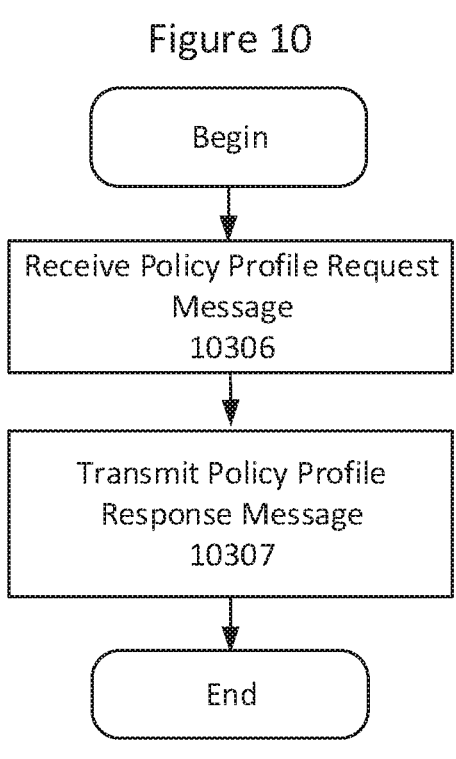

METHODS SUPPORTING USAGE REPORTING RULES WITH AND WITHOUT ASSOCIATED REPORTING RULES AND RELATED NETWORK NODES

CROSS-REFERENCE TO RELATED APPLICATIONS

This application is a 35 U.S.C. § 371 national stage application for International Application No. PCT/IB2020/061159, entitled "METHODS SUPPORTING USAGE REPORTING RULES WITH AND WITHOUT ASSOCIATED REPORTING RULES AND RELATED NETWORK NODES", filed on Nov. 25, 2020, which claims priority to EP patent application No. 20382842.1, filed on Sep. 24, 2020 assigned to the assignee hereof, and expressly incorporated herein by reference.

TECHNICAL FIELD

The present disclosure relates generally to communications, and more particularly to communication methods and related devices and nodes supporting wireless communications.

BACKGROUND

FIG. 1 illustrates the 5G network reference architecture as defined by the $3^{rd}$ Generation Partnership Project 3GPP. FIG. 2 illustrates the 3GPP $5^{th}$ Generation Core 5GC network architecture for policy, charging and analytics. Relevant architectural aspects for the present disclosure include: CHF (Charging Function); PCF (Policy Control Function); SMF (Session Management Function); and UPF (User Plane Function). Further discussion of these architectural aspects is provided below.

The Charging Function (CHF) supports offline and online charging functionality and exposes the Nchf interface towards the consumers (e.g., the SMF).

The Policy Control Function (PCF) supports a unified policy framework to govern the network behavior. For the present disclosure, the PCF provides PCC (Policy and Charging Control) rules to the SMF.

The Session Management function (SMF) supports different functionalities, e.g. Session Establishment, modify and release, and policy related functionalities such as termination of interfaces towards Policy control functions, Charging data collection, support of charging interfaces and control and coordination of charging data collection at UPF. For the present disclosure, the SMF receives PCC rules from PCF and configures UPF accordingly through N4 reference point (PFCP protocol) as discussed below.

The SMF controls the packet processing in the UPF by establishing, modifying or deleting PFCP Sessions and by provisioning (i.e. adding, modifying or deleting) Packet Detection Rules PDRs, Forwarding Action Rules FARs, Quality of Service Enforcement Rules QERs and/or Usage Reporting Rules URRs per Packet Flow Control Protocol PFCP session, whereby a PFCP session may correspond to an individual PDU session or a standalone PFCP session not tied to any Protocol Data Unit PDU session.

Each PDR contains Packet Detection Information PDI specifying the traffic filters or signatures against which incoming packets are matched. Each PDR is associated with the following rules providing the set of instructions to apply to packets matching the PDI: one Forwarding Action Rule FAR; zero, one or more QoS Enforcement Rules; and zero, one or more Usage Reporting Rules URRs. The one FAR contains instructions related to the processing of the packets, specifically forward, redirect, apply header enrichment, duplicate, drop or buffer the packet with or without notifying the CP function about the arrival of a DL packet. The zero, one or more QERs contains instructions related to the Quality of Service QoS enforcement of the traffic. The zero, one or more URRs contains instructions related to traffic measurement and reporting.

The User Plane function (UPF) supports handling of user plane traffic based on the rules received from SMF, for the present disclosure, packet inspection (through PDRs) and different enforcement actions, e.g. traffic steering, QoS, Charging/Reporting (through FARs, QERs, URRs).

Existing approaches, however, may require burdensome signaling overhead in the core network to support session establishment and/or modification procedures.

SUMMARY

According to some embodiments of inventive concepts, a method of operating a first core network CN node is provided. A plurality of Policy Charging and Control PCC rules are received for a communication device corresponding to a plurality of applications used by the communication device. Each of the plurality of applications has a respective application Identifier appID, and each of the PCC rules of the plurality of PCC rules is associated with a respective application of the plurality of applications and corresponding appID. A first information element is generated based on a first PCC rule of the plurality of PCC rules associated with a respective first application of the plurality of applications used by the communication device and a corresponding first appID. The first information element includes a first Usage Reporting Rule URR having a first URR Identifier and including first URR parameters associated with the first URR. A second information element is generated based on a second PCC rule of the plurality of PCC rules associated with a respective second application of the plurality of applications used by the communication device and a corresponding second appID. The second information element includes a second URR having a second URR identifier without including second URR parameters associated with the second URR. A session establishment request message is transmitted to a second CN node. The session establishment request message includes the first information element including the first URR having the first URR Identifier and including the first URR parameters associated with the first URR, and the second information element including the second URR having the second URR identifier without including the second URR parameters associated with the second URR.

As used herein, a URR parameter may define an instruction related to traffic measurement and/or reporting for the respective URR.

According to some embodiments of inventive concepts, a method of operating a first core network CN node is provided. A session establishment request message is received from a second CN node, wherein the session establishment request message is provided to establish a session for a communication device. The session establishment request message includes a first information element associated with a first application having a first application identifier appID, and the first information element includes a first Usage Reporting Rule URR having a first URR Identifier and including first URR parameters associated with the first URR. The session establishment request message also includes a second information element associated with a second application having a second appID, and the second information element includes a second URR having a second URR identifier without including second URR parameters associated with the second URR. An application traffic packet is received from the communication device, wherein the application traffic packet is associated with the second application having the second appID. A session report request message is transmitted to the second CN node responsive to receiving the application traffic packet associated with the second application having the second appID, wherein the session report request message includes the second URR identifier and the second appID. A session modification request message is received from the second CN node after transmitting the session report request message. The session modification request message includes a third information element associated with the second application having the second appID, and the third information element includes a third URR having the second URR Identifier and including the second URR parameters associated with the third URR.

According to some embodiments of inventive concepts, a method of operating a first core network CN node is provided. A policy request message is received from a second CN node. A policy response message is transmitted to the second CN node responsive to receiving the policy request message. The policy response message includes subscriber policy information for a communication device, wherein the subscriber policy information includes a plurality of Policy Charging and Control PCC rules for the communication device corresponding to a plurality of applications used by the communication device. Each of the plurality of applications has a respective application Identifier appID, and each of the PCC rules of the plurality of PCC rules is associated with a respective application of the plurality of applications and corresponding appID. The subscriber policy information includes an indication to enable URR optimization and/or Quality Enforcement Rule QER optimization for the PDU session.

According to some embodiments of inventive concepts, a method of operating a first core network CN node is provided. A policy profile request message is received from a second CN node, wherein the policy profile request message includes a subscriber identifier associated with a communication device. A policy profile response message is transmitted to the second CN node responsive to receiving the policy profile request message. The policy profile response message includes subscriber profile information for the communication device, and the subscriber profile information includes an indication to enable usage reporting rule URR optimization and/or Quality Enforcement Rule QER optimization.

According to some embodiments, signaling overhead in the core network may be reduced during session establishment and/or modification procedures, and/or memory usage in the core network may be reduced. In a communication network, for example, a communication device may be configured with many applications, and respective URRs (with corresponding URR parameters) may be associated with each application. A majority of data traffic for the communication device, however, may be provided for only a few of the many configured applications. By way of example, 10-20 percent of the applications/URRs may account for 80-90 percent of the data traffic for the communication device, and/or 30 percent (or fewer) of the applications/URRs may account for 99.9+ percent of the traffic, so that a given session for a communication device may never use 70+ percent of the configured URRs. According to some embodiments, by delaying installation of URR parameters for less frequently used applications/URRs, a 70+ percent reduction of core network memory usage and/or signaling for such URR parameters may be realized.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 7, 8, 9, and 10 are flow charts illustrating operations of core network nodes according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
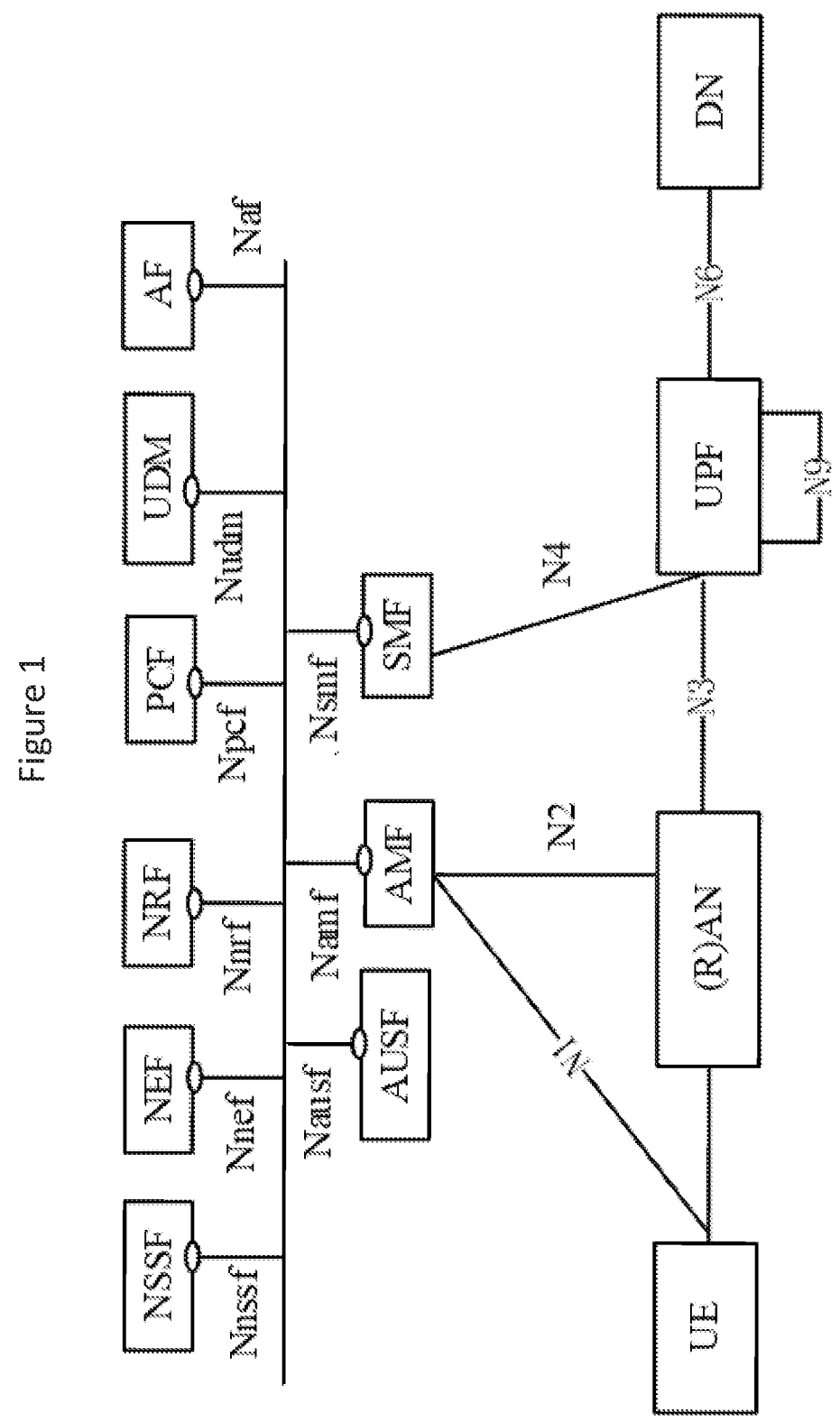
FIG. 1 is a block diagram illustrating a 5$^{th}$ Generation 5G network architecture.
Figure 2:
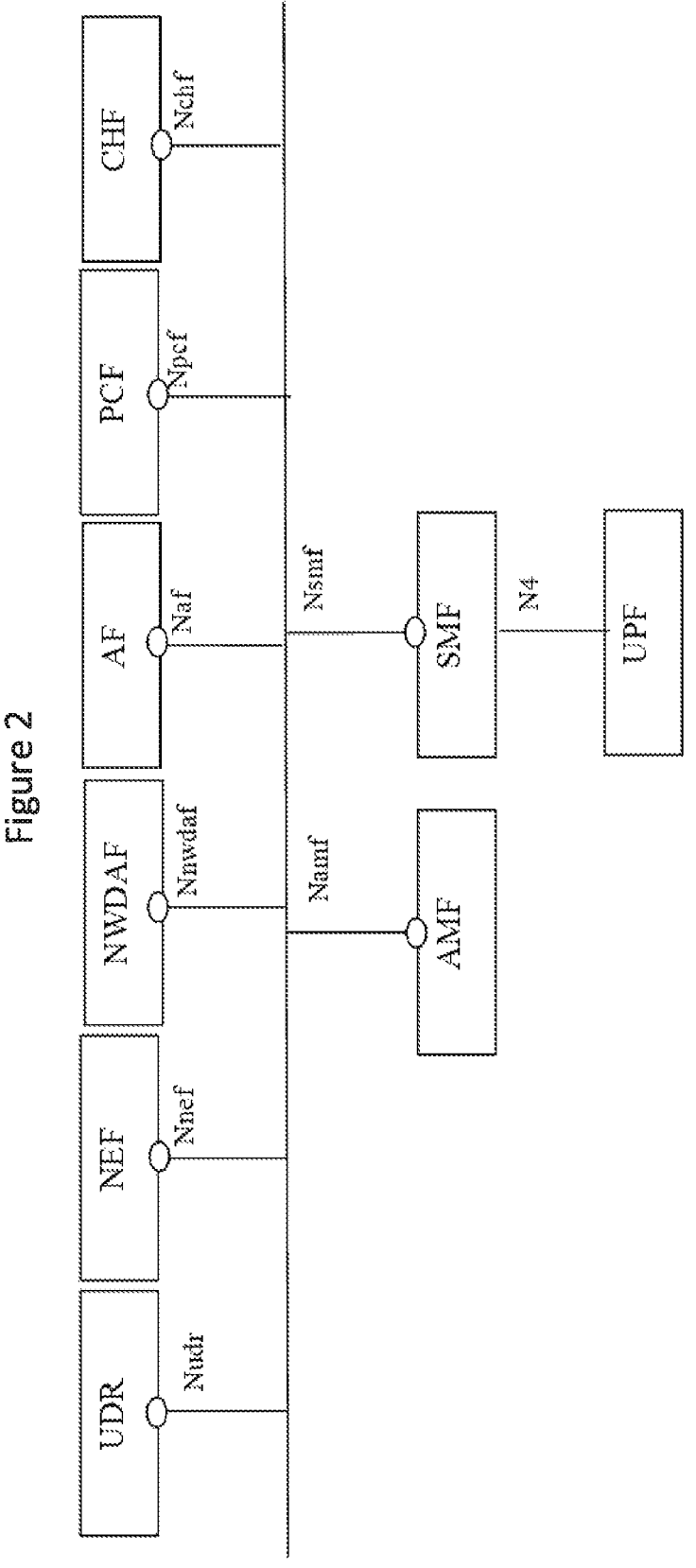
FIG. 2 is a block diagram illustrating a 5$^{th}$ Generation Core 5GC architecture for policy, charging, and analytics.
Figure 3A:
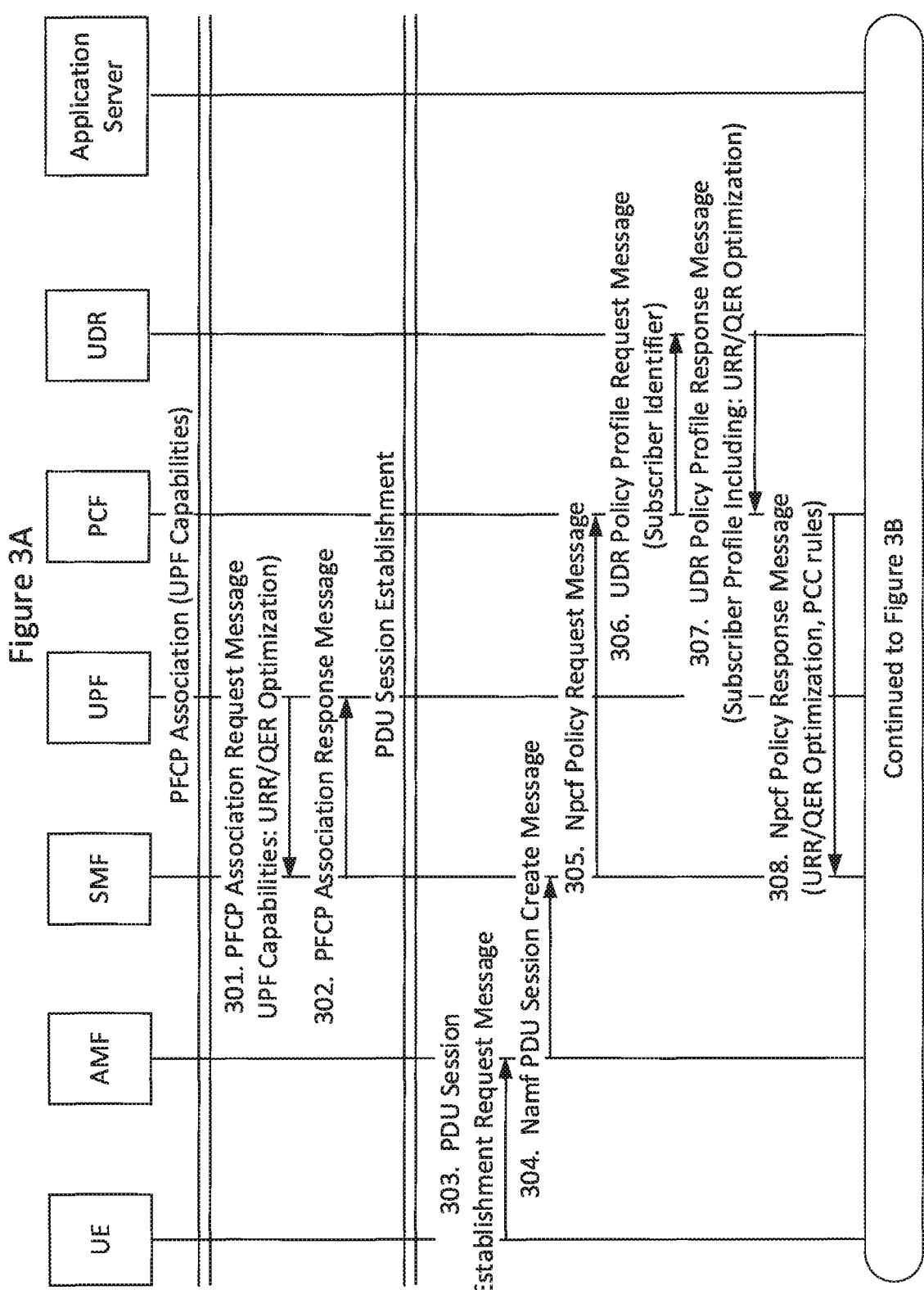
FIGS. 3A to 3D provide a message diagram illustrating messages/operations according to some embodiments of inventive concepts.
Figure 3B:
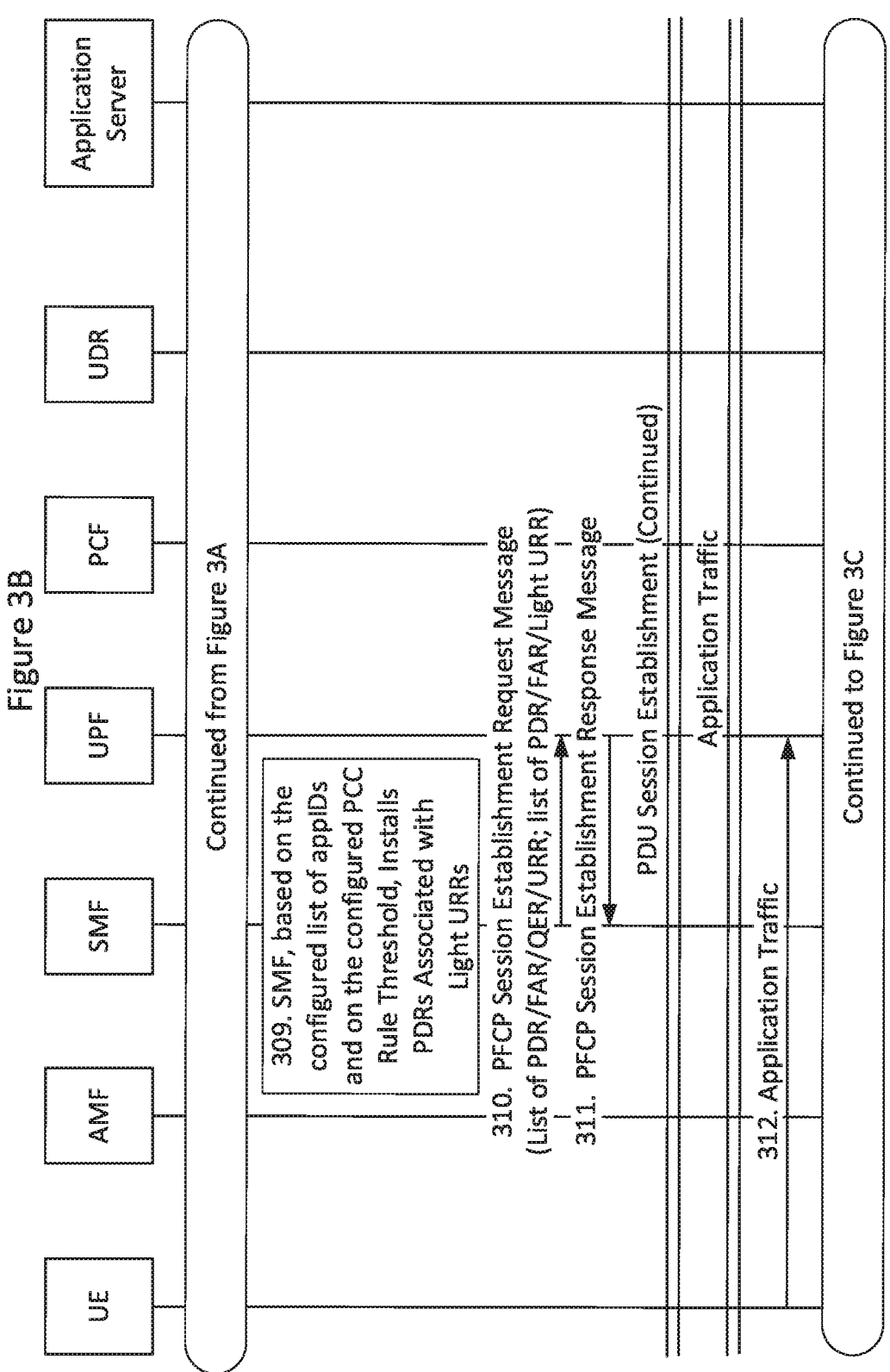
Figure 3C:
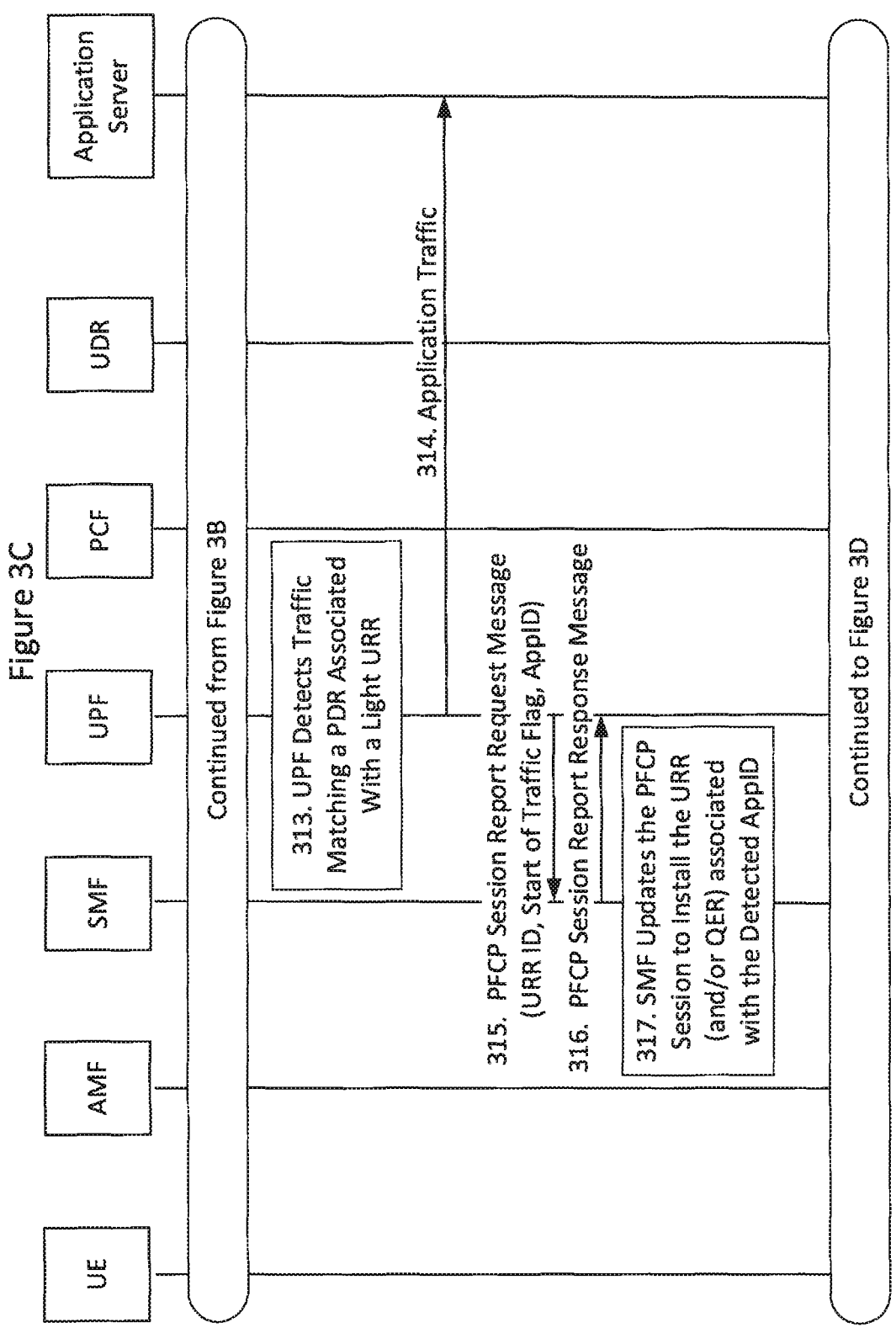
Figure 3D:
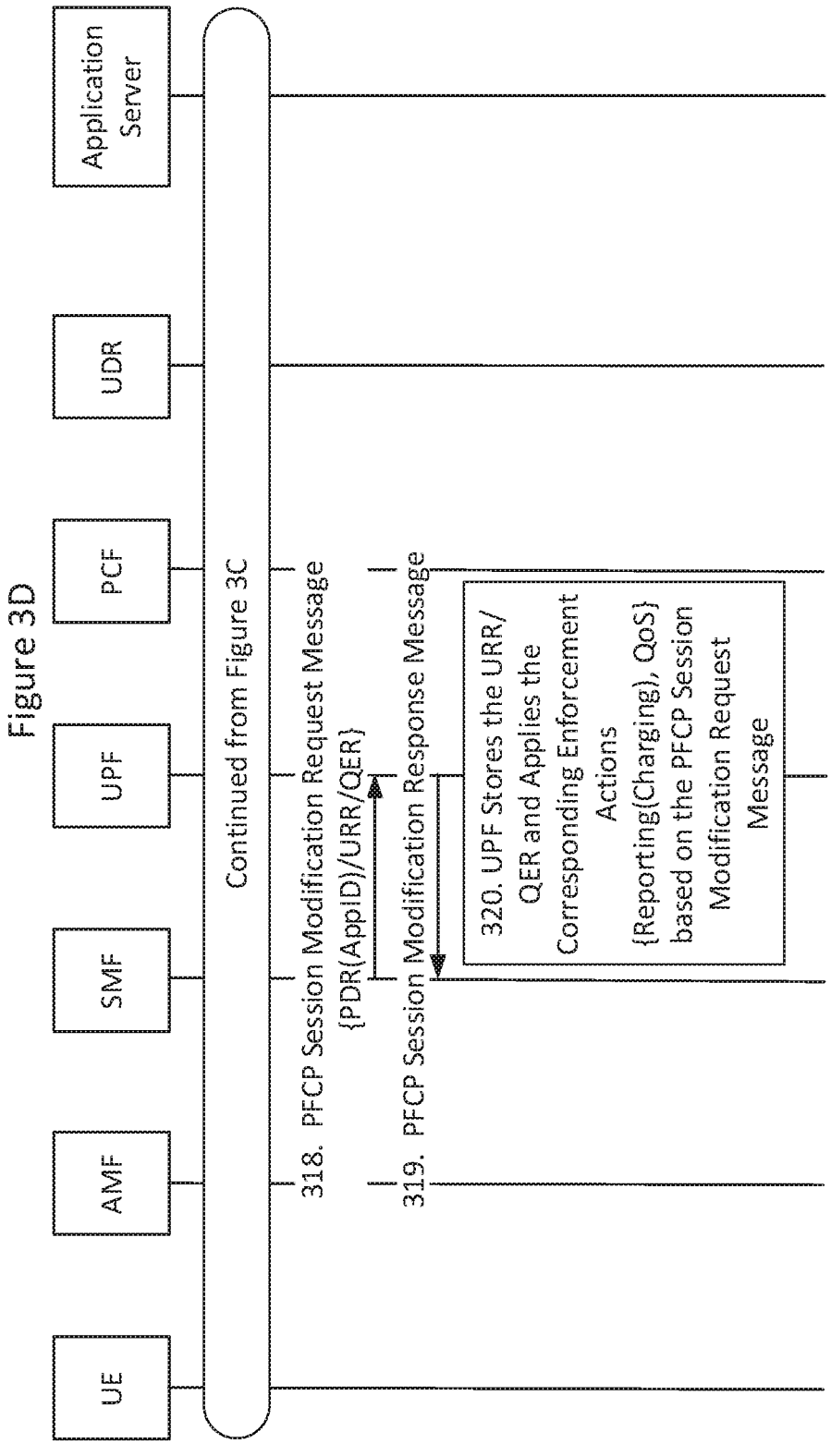
Figure 4:
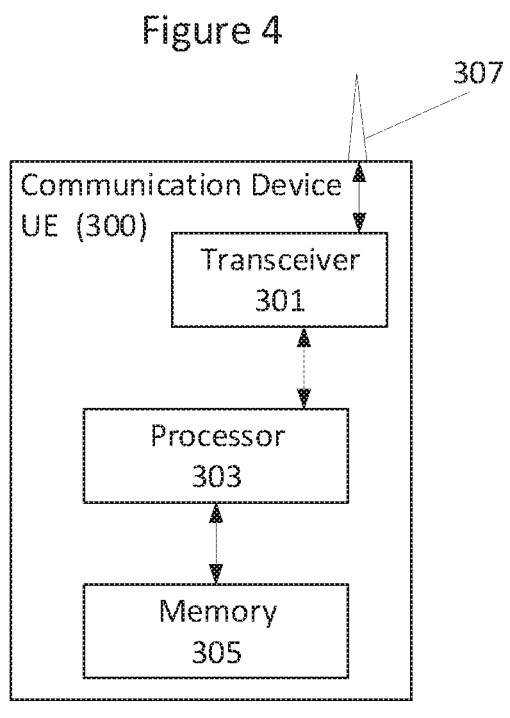
FIG. 4 is a block diagram illustrating a communication device UE according to some embodiments of inventive concepts.

FIG. 4 is a block diagram illustrating elements of a communication device UE 400 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. As shown, communication device UE may include an antenna 407, and transceiver circuitry 401 (also referred to as a transceiver) including a transmitter and a receiver configured to provide uplink and downlink radio communications with a base station(s) (also referred to as a RAN node) of a radio access network. Communication device UE may also include processing circuitry 403 (also referred to as a processor) coupled to the transceiver circuitry, and memory circuitry 305 (also referred to as memory) coupled to the processing circuitry. The memory circuitry 305 may include computer readable program code that when executed by the processing circuitry 403 causes the processing circuitry to perform operations according to embodiments disclosed herein. According to other embodiments, processing circuitry 403 may be defined to include memory so that separate memory circuitry is not required. Communication device UE may also include an interface (such as a user interface) coupled with processing circuitry 403, and/or communication device UE may be incorporated in a vehicle.

As discussed herein, operations of communication device UE may be performed by processing circuitry 403 and/or transceiver circuitry 401. For example, processing circuitry 403 may control transceiver circuitry 401 to transmit communications through transceiver circuitry 401 over a radio interface to a radio access network node (also referred to as a base station) and/or to receive communications through transceiver circuitry 401 from a RAN node over a radio interface. Moreover, modules may be stored in memory circuitry 305, and these modules may provide instructions so that when instructions of a module are executed by processing circuitry 403, processing circuitry 403 performs respective operations (e.g., operations discussed below with respect to Example Embodiments relating to wireless communication devices). According to some embodiments, a communication device UE 400 and/or an element(s)/function(s) thereof may be embodied as a virtual node/nodes and/or a virtual machine/machines.

Figure 5:
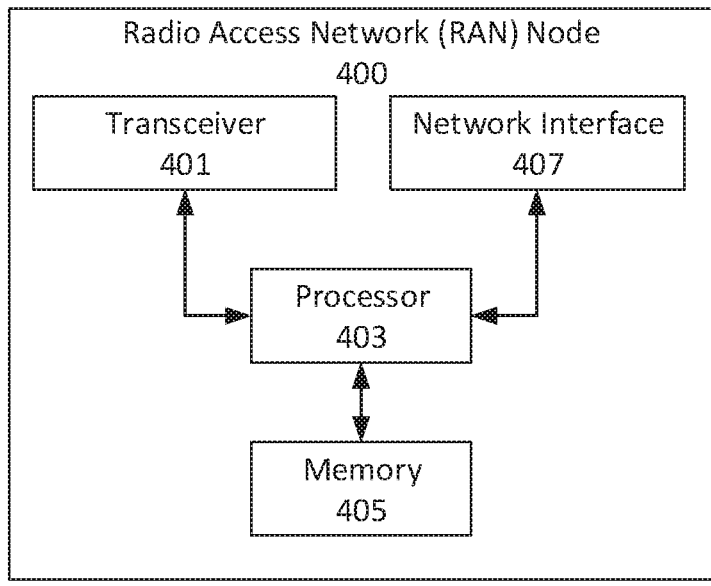
FIG. 5 is a block diagram illustrating a radio access network RAN node (e.g., a base station eNB/gNB) according to some embodiments of inventive concepts.

FIG. 5 is a block diagram illustrating elements of a radio access network RAN node 500 (also referred to as a network node, base station, eNodeB/eNB, gNodeB/gNB, etc.) of a Radio Access Network (RAN) configured to provide cellular communication according to embodiments of inventive concepts. As shown, the RAN node may include transceiver circuitry 501 (also referred to as a transceiver) including a transmitter and a receiver configured to provide uplink and downlink radio communications with mobile terminals. The RAN node may include network interface circuitry 507 (also referred to as a network interface) configured to provide communications with other nodes (e.g., with other base stations) of the RAN and/or core network CN. The network node may also include processing circuitry 503 (also referred to as a processor) coupled to the transceiver circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the RAN node may be performed by processing circuitry 503, network interface 507, and/or transceiver 501. For example, processing circuitry 503 may control transceiver 501 to transmit downlink communications through transceiver 501 over a radio interface to one or more mobile terminals UEs and/or to receive uplink communications through transceiver 501 from one or more mobile terminals UEs over a radio interface. Similarly, processing circuitry 503 may control network interface 507 to transmit communications through network interface 507 to one or more other network nodes and/or to receive communications through network interface from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to RAN nodes). According to some embodiments, RAN node 500 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 6:
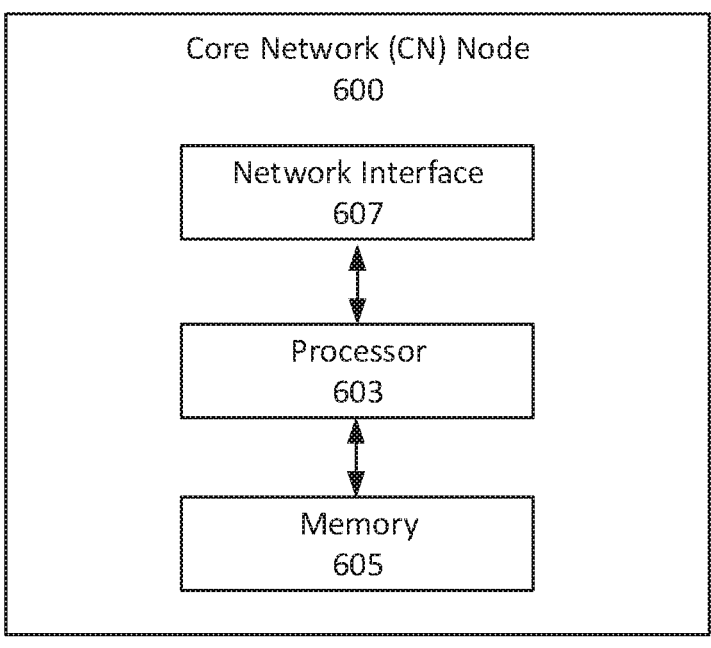
FIG. 6 is a block diagram illustrating a core network CN node (e.g., a PCF node, a PCRF node, PGW-C node, a PGW-U node, SMF node, a TDF-C node, a TDF-U node, a UPF node, etc.) according to some embodiments of inventive concepts.

FIG. 6 is a block diagram illustrating elements of a core network CN node 600 (e.g., an SMF node, an AMF node, etc.) of a communication network configured to provide cellular communication according to embodiments of inventive concepts. As shown, the CN node may include network interface circuitry 607 (also referred to as a network interface) configured to provide communications with other nodes of the core network and/or the radio access network RAN. The CN node may also include a processing circuitry 603 (also referred to as a processor) coupled to the network interface circuitry, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the CN node may be performed by processing circuitry 603 and/or network interface circuitry 607. For example, processing circuitry 603 may control network interface circuitry 607 to transmit communications through network interface circuitry 607 to one or more other network nodes and/or to receive communications through network interface circuitry from one or more other network nodes. Moreover, modules may be stored in memory 605, and these modules may provide instructions so that when instructions of a module are executed by processing circuitry 603, processing circuitry 603 performs respective operations (e.g., operations discussed below with respect to Example Embodiments relating to core network nodes). According to some embodiments, CN node 600 and/or an element(s)/function(s) thereof may be embodied as a virtual node/nodes and/or a virtual machine/machines.

3GPP has defined the PFCP protocol between SMF and UPF. This protocol may be heavy in terms of signaling (at PFCP Session Establishment and PFCP Session Modification procedures).

A PFCP session usually has a large number of PDRs (and consequently a large number of associated URRs and/or QERs). During the PFCP session, only a small amount of the installed PDRs will match (i.e., a session with 200 uplink/downlink UL/DL PDRs installed but the user will only run a small subset of the apps (PDRs) during a certain session, e.g. Facebook, YouTube, Netflix and some other).

Some embodiments of inventive concepts may address issues discussed above and/or may extend the PFCP protocol, for example, by defining an improved/optimized procedure which may reduce the amount of signaling at PFCP Session Establishment and/or at PFCP Session Modification and/or may reduce the memory consumption at UPF.

Some embodiments of inventive concepts may be provided as discussed below.

At a PFCP Association procedure:

A PFCP extension (in the PFCP Association procedure) may be provided with a new UPF capability: to support of URR/QER Optimization, which allows the SMF to select a UPF supporting this capability on a per PFCP session basis.

At a PFCP Session Establishment/Modification procedure:

For a PFCP session, the SMF translates the PCC rules from PCF into PDRs/FARs/QERs/URRs forwards the PDRs/FARs/QERs/URRs towards the UPF, and procedures are described below according to some embodiments of inventive concepts.

The SMF is configured as follows:

A list of applications (corresponding to applications which are commonly used), e.g. Facebook, YouTube, Netflix, etc.

A configurable threshold (e.g., set to 10 as default value) relative to the number of PCC rules which is the trigger of the URR/QER optimization procedure described below.

At the SMF (when generating the PFCP Session Establishment/Modification Request message):

If there is a PCC rule with an appID in the list above, the SMF generates the URR (if required) and QER (if required), as defined by existing 3GPP procedures.

If there is a PCC rule with an appID not in the list above, the SMF will follow the procedure described below:

If the number of PCC rules (for appIDs not in the list) is above the above threshold (e.g., 10), the SMF generates what is referred to as "light URRs", as follows:

At "Create PDR" Information Element IE: each PDR is associated to a FAR ID, a URR ID (if required) and a QER ID (if required).

The "Create URR" IE corresponding to the URR ID above is not included by SMF.

The "Create QER" IE corresponding to the QER ID above is not included by SMF.

If the number of PCC rules (for appIDs not in the list) is below a certain configurable threshold (e.g., 10), the SMF generates the URR (if required) and QER (if required) as defined by existing 3GPP procedures.

At the UPF (when receiving the PFCP Session Establishment/Modification Request message) the following operation may be performed:

The UPF answers with a successful PFCP Session Establishment/Modification Response message.

The UPF analyzes traffic for the PFCP session and for the first match with a PDR associated with a URR (URR ID) and/or QER (QER ID) for which it has not been received the corresponding "Create URR" IE and/or "Create QER" IE, UPF triggers a PFCP Session Report Request message including:

"Report Type" IE indicating Usage Report.

"Usage Report" IE including:

URR ID

"Usage Report Trigger" IE indicating start of traffic detected

"Application Detection Information" IE indicating the detected appID

The SMF, when receiving the above PFCP Session Report Request message, triggers a PFCP Session Modification Request message including:

"Create URR" IE (if required, for the URR ID above)

"Create QER" IE (if required, for the corresponding QER ID)

Additionally, and separately or in combination with the optimization procedure described above, the following URR optimization procedure may be provided:

When online charging applies for the PFCP session, the SMF provisions one "light URR" as follows:

Start of traffic event indicator/flag

Volume Quota=0

No URRs for offline or System Information SI level reporting.

Since no traffic will be allowed until a quota has been granted from the CHF (OCS), there is no problem with not creating the offline URR(s) and the SI URRs until quota has been granted. And it will not increase the amount of signaling.

Once quota has been granted, SMF creates:

URR for online charging ("Create URR" IE).

URR for offline charging ("Create URR" IE).

"light URRs" for all SIs (by updating the PDRs as needed).

As an optional enhancement, if a subscriber is frequently using a certain application (not in the list above, which is assumed to be generic for all subscribers), that application can be included in the list for that subscriber (which means that the URR/QER optimization will not apply for that application and for that specific subscriber).

Some embodiments of inventive concepts may allow the network operator to support an improved/optimized procedure which: reduces an amount of signaling at PFCP Session Establishment and/or at PFCP Session Modification; and/or reduces memory consumption at UPF.

Some embodiments of inventive concepts may extend the PFCP protocol by defining an improved/optimized procedure which may reduce the amount of signaling at PFCP Session Establishment procedures and/or PFCP Session Modification procedures and/or may reduce memory consumption at UPF.

FIGS. 3A-D provide a message/sequence diagram illustrating operations/messages according to some embodiments of inventive concepts. Messages/operations of FIGS. 3A-D are discussed below.

Operations 301 and 302) During a PFCP Association procedure between the UPF and SMF nodes/entities, existing mechanisms to report UPF capabilities may be extended with a new capability (URR and/or QER Optimization: UQOU, as indicated in the last line of the table below). This may allow the SMF to know which UPFs support this capability and thus can be used by the SMF entity/node to determine UPF selection. The Table below illustrates a modification of Table 8.2.25-1 ("UP Function Features") from 3GPP TS 29.244 V16.1.0 (2019 September), also referred to as Reference [2], with octet/bit "8/4" added to include the UQOU feature to indicate that URR and/or QER Optimization is supported by the UP function (UPF) entity/node.

| Feature Octet/Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation/release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see clause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see clause 5.15). |
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature (see clause 5.18). |
| 7/1 | DPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs (see clause 5.19). |
| 7/3 | UEIP | N4 | The UPF supports allocating UE IP addresses or prefixes (see clause 5.21). |
| 7/4 | SSET | N4 | UPF support of PFCP sessions successively controlled by different SMFs of a same SMF Set (see clause 5.22). |
| 7/5 | MNOP | Sxa, Sxb, Sxc, N4 | UPF supports measurement of number of packets which is instructed with the flag 'Measurement of Number of Packets' in a URR. See also 5.2.2.2.1. |
| 7/6 | MTE | N4 | UPF supports multiple instances of Traffic Endpoint IDs in a PDI. |
| 7/7 | BUNDL | Sxa, Sxb, Sxc, N4 | PFCP messages bunding (see clause 6.5) is supported by the UP function. |
| 7/8 | GCOM | N4 | UPF support of 5G VN Group Communication. (See clause 5.23) |
| 8/1 | MPAS | N4 | UPF support for multiple PFCP associations to the SMFs in an SMF set (see clause 5.22.3). |
| 8/2 | RTTL | N4 | The UP function supports redundant transmission at transport layer. |
| 8/3 | VTIME | Sxb, N4 | UPF support of quota validity time feature. |
| 8/4 | UQOU | Sxb, Sxc, N4 | URR and QER Optimization is supported by the UP function. |

Operations 303 and 304) The UE triggers PDU session establishment, by sending a PDU Session Establishment Request to an Access and Mobility Management Function AMF entity/node. The AMF entity/node selects an SMF entity/node to manage the PDU session (the SMF selection function in the AMF entity/node selects an SMF instance based on the available SMF instances obtained from NRF or on the configured SMF information in the AMF) and triggers Nsmf PDU Session Create. Note that the diagram of FIGS. 3A-D does not include all the signaling messages involved in the PDU Session Establishment procedure. The relevant signaling messages for the present disclosure are described in subsequent operations.

Operation 305) SMF triggers a Npcf_SMPolicy Control_Create Request message to retrieve SM policies for the user PDU session.

Operation 306) The PCF triggers a Nudr_Query Request message including the subscriber identifier to retrieve the policy data for this subscriber's PDU session.

Operation 307) The UDR answers with a Nudr_Query Response message including the Subscriber Policy Data. In this example, there is an indication (e.g., flag) to enable URR/QER Optimization for this PDU session. Alternatively, URR/QER Optimization can be enabled on a per subscriber group basis or on a per global basis (i.e., for all subscribers). The above indication (e.g., flag) is an optional procedure and may not be required for some embodiments of inventive concepts.

Operation 308) The PCF generates PCC (Policy and Charging Control) rules for this PDU session and includes the above indication (e.g., flag) to enable URR/QER Optimization for this PDU session. The above indication (e.g., flag) is an optional procedure and may not be required for some embodiments of inventive concepts.

Operations 309 and 310) The SMF, when receiving the above indication of operation 308 (e.g., flag) to enable URR/QER Optimization for this PDU session, applies the following logic. As mentioned in Operations 307 and 308 above, the indication (e.g., flag) is optional and may not be required for some embodiments of inventive concepts. For example, the SMF could also apply the following logic based on local configuration:

Precondition: SMF is configured as follows:

The SMF is configured with a list of appIDs for applications, for example, applications which are commonly used (e.g., Facebook, YouTube, Netflix, etc.). As an optional enhancement, if a subscriber is frequently using a certain application (not in the list above, which is assumed to be generic for all subscribers), that application can be included in the list for that subscriber (which means that the URR/QER optimization will not apply for that application and for that specific subscriber).

The SMF is configured with a threshold (e.g., set to 10 as a default value) relative to the number of PCC rules which is the trigger of the URR/QER optimization procedure described below.

SMF generates/transmits the PFCP Session Establishment Request message towards the UPF as follows:

If there is a PCC rule with an appID in the list above (e.g., the list of appIDs for commonly used apps), the SMF generates the URR (if required) and QER (if required), as defined by existing 3GPP procedures.

If there is a PCC rule with an appID not in the list above, the SMF will follow the procedure described below:

If the number of PCC rules (for appIDs not in the list) is greater than the above threshold (e.g., 10), the SMF generates what is referred to as a "light URRs", as follows:

At "Create PDR" IE: each PDR is associated to a FAR ID, URR ID (if required) and QER ID (if required).

The "Create URR" IE corresponding to the URR ID above is not included by the SMF.

The "Create QER" IE corresponding to the QER ID above is not included by the SMF.

If the number of PCC rules (for appIDs not in the list) is below a certain configurable threshold (e.g., 10), SMF generates the URR (if required) and the QER (if required) as defined by existing 3GPP procedures.

Operation 311) The UPF answers SMF with a successful PFCP Session Establishment Response message.

Operation 312) After the PDU session is established, the user opens an application (e.g., example.com) and the UE sends application traffic towards the application server (e.g., based on the FAR associated with the appID).

Operations 313, 314 and 315) UPF analyzes traffic for the PFCP session and for the first match with a PDR associated to a light URR, i.e. a URR (URR ID) for which it has not been received the corresponding "Create URR" IE, UPF triggers a PFCP Session Report Request message including:

"Report Type" IE indicating Usage Report.

"Usage Report" IE including:

URR ID

"Usage Report Trigger" IE indicating start of traffic detected

"Application Detection Information" IE indicating the detected appID

Operation 316) SMF answers UPF with a PFCP Session Report Response message.

Operations 317 and 318) The SMF, when receiving the above PFCP Session Report Request message, updates the PFCP session to install the URR (and/or QER) associated to the detected appID. In order to do this, the SMF triggers a PFCP Session Modification Request message including:

"Create URR" IE (if required, for the URR ID above)

"Create QER" IE (if required, for the corresponding QER ID)

Operation 319) The UPF answers the SMF with a successful PFCP Session Modification Response message.

Operation 320) The UPF stores the above URR/QER and applies the corresponding enforcement actions (e.g., Reporting/Charging, QoS).

Moreover, some embodiments of the present disclosure may be applied to the 5G network architecture, and also the same mechanisms can be applied to 4G by: replacing PCF with PCRF; replacing SMF with PGW-C or TDF-C; and/or replacing UPF with PGW-U or TDF-U.

In summary, a PFCP extension is proposed which includes an improved/optimized procedure which may significantly reduce the amount of signaling during PFCP Session Establishment and/or PFCP Session Modification procedures and may also reduce memory usage at the UPF.

Operations of a Core Network CN node 600 (implemented using the structure of FIG. 6) will now be discussed with reference to the flow chart of FIG. 7 according to some embodiments of inventive concepts. For example, modules may be stored in memory 605 of FIG. 6, and these modules may provide instructions so that when the instructions of a module are executed by respective CN node processing circuitry 603, processing circuitry 603 performs respective operations of the flow chart.

According to some embodiments at block 7301, processing circuitry 603 receives (through network interface 607) an association request message from the second CN node, wherein the association request message includes an indication that the second CN node supports URR optimization and/or Quality Enforcement Rule QER optimization. Operations of block 7301 may be performed, for example, as discussed above with respect to operation 301 of FIG. 3A where the PFCP Association Request message is received by the UPF node.

According to some embodiments at block 7302, processing circuitry 603 transmits (through network interface 607) an association response message to the second CN node acknowledging the association request message of block 7301. Operations of block 7302 may be performed, for example, as discussed above with respect to operation 302 of FIG. 3A where the PFCP Association Response message is transmitted to the UPF node.

According to some embodiments at block 7304, processing circuitry 603 receives (through network interface 607) a protocol data unit PDU session create message requesting creation of a PDU session for a communication device 400. Operations of block 7304 may be performed, for example, as discussed above with respect to operation 304 of FIG. 3A where the Namf PDU Session Create message is received from the AMF node.

According to some embodiments at block 7305, processing circuitry 603 transmits (through network interface 607) a policy request message to a third CN node responsive to receiving the PDU session create message. Operations of block 7304 may be performed, for example, as discussed above with respect to operation 305 of FIG. 3A where the Npcf Policy Request message to the PCF node.

According to some embodiments at block 7308, processing circuitry 603 receives (through network interface 607) a plurality of Policy Charging and Control PCC rules for the communication device 400. The plurality of PCC rules correspond to a plurality of applications used by the communication device, each of the plurality of applications has a respective application Identifier appID, and each of the PCC rules of the plurality of PCC rules is associated with a respective application of the plurality of applications and corresponding appID. For example, a policy response message may be received from the third CN node (e.g., a PCF node, a PCRF node, etc.), the policy response message may include subscriber policy information for the communication device, the subscriber policy information may include the plurality of PCC rules, and the policy response message corresponds to the policy request message. According to some embodiments, the subscriber policy information (included in the policy response message of operation 7308) for the communication device may include an indication to enable URR optimization and/or Quality Enforcement Rule QER optimization for the PDU session. Operations of block 7308 may be performed, for example, as discussed above with respect to operation 308 of FIG. 3A where a plurality of PCC rules are received from the PCF node in the Npcf Policy Response message.

According to some embodiments at block 7309, processing circuitry 603 generates a plurality of information elements, for example, including first and second information elements. Processing circuitry 603 generates a first information element based on a first PCC rule of the plurality of PCC rules associated with a respective first application of the plurality of applications used by the communication device and a corresponding first appID, wherein the first information element includes a first URR having a first URR Identifier and includes first URR parameters associated with the first URR. Processing circuitry 603 generates a second information element based on a second PCC rule of the plurality of PCC rules associated with a respective second application of the plurality of applications used by the communication device and a corresponding second appID, wherein the second information element includes a second URR having a second URR identifier without including second URR parameters associated with the second URR. According to some embodiments, the second information element may be generated including the second URR having the second URR identifier without including the second URR parameters associated with the second URR responsive to the subscriber policy information for the communication device including the indication to enable URR optimization and/or QER optimization for the PDU session. Operations of block 7309 may be performed, for example, as discussed above with respect to operation 309 of FIG. 3B.

According to some embodiments at block 7310, processing circuitry 603 transmits (through network interface 607) a session establishment request message to the second CN node. The session establishment request message includes the first information element including the first URR having the first URR Identifier and including the first URR parameters associated with the first URR and the second information element including the second URR having the second URR identifier without including the second URR parameters associated with the second URR. The session establishment request message may be transmitted to the second CN node responsive to the association request message including the indication that the second CN node supports URR optimization and/or QER optimization. Operations of block 7310 may be performed, for example, as discussed above with respect to operation 310 of FIG. 3B where the PFCP Session Establishment Request message is transmitted to the UPF node.

According to some embodiments at block 7311, processing circuitry 603 receives (through network interface 607) a session establishment response message from the second CN node acknowledging the session establishment request message. Operations of block 7311 may be performed, for example, as discussed above with respect to operation 311 of FIG. 3B where the PFCP Session Establishment Response message is received from the UPF node.

According to some embodiments at block 7315, processing circuitry 603 receives (through network interface 607) a session report request message from the second CN node after transmitting the session establishment request message, wherein the session report request message includes the second URR Identifier and the second appID. Operations of block 7315 may be performed, for example, as discussed above with respect to operation 315 of FIG. 3C.

According to some embodiments at block 7316, processing circuitry 603 transmits a session report response message to the second CN node acknowledging the session report request message of block 7315. Operations of block 7316 may be performed, for example, as discussed above with respect to operation 316 of FIG. 3C where the PFCP Session Report Response message is transmitted to the UPF node.

According to some embodiments at block 7317, processing circuitry 603 generates a third information element based on the second PCC rule responsive to the session report request message including the second URR identifier. The third information element includes a third URR having the second URR Identifier and including the second URR parameters associated with the third URR. Operations of block 7317 may be performed, for example, as discussed above with respect to operation 317 of FIG. 3C.

According to some embodiments at block 7318, processing circuitry 603 transmits (through network interface 607) a session modification request message to the second CN node. The session modification request message includes the third information element including the third URR having the second URR Identifier and including the second URR parameters associated with the third URR. Operations of block 7318 may be performed, for example, as discussed above with respect to operation 318 of FIG. 3D where the PFCP Session Modification Request message is transmitted to the UPF node.

According to some embodiments, the second URR parameters associated with the third URR of the session modification request message of block 7318 may include a charging rule associated with the third URR.

According to some embodiments, the first information element may include a first packet detection rule PDR based on the first PCC rule wherein the first PDR defines a detection rule for application traffic packets associated with the first application, the second information element may include a second PDR based on the second PCC rule wherein the second PDR defines a detection rule for application traffic packets associated with the second application, and the third information element may include the second PDR. For example, the first PDR may include the first appID, and the second PDR may include the second appID.

According to some embodiments, the third information element may include a Quality of Service Enforcement Rule QER based on the second PCC rule, the QER may define an enforcement rule regarding Quality of Service for packets associated with the second application, and the QER is omitted from the second information element.

According to some embodiments, the session report request message may include the second URR identifier, the second appID, and a start of traffic indicator, and the third information element may be generated responsive to the session report request message including the start of traffic indicator.

According to some embodiments at block 7319, processing circuitry 603 receives (through network interface 607) a session modification response message acknowledging the session modification request message of block 7318. Operations of block 7319 may be performed, for example, as discussed above with respect to operation 319 of FIG. 3D where the PFCP Session Modification Response message is received from the UPF node.

Figure 7:
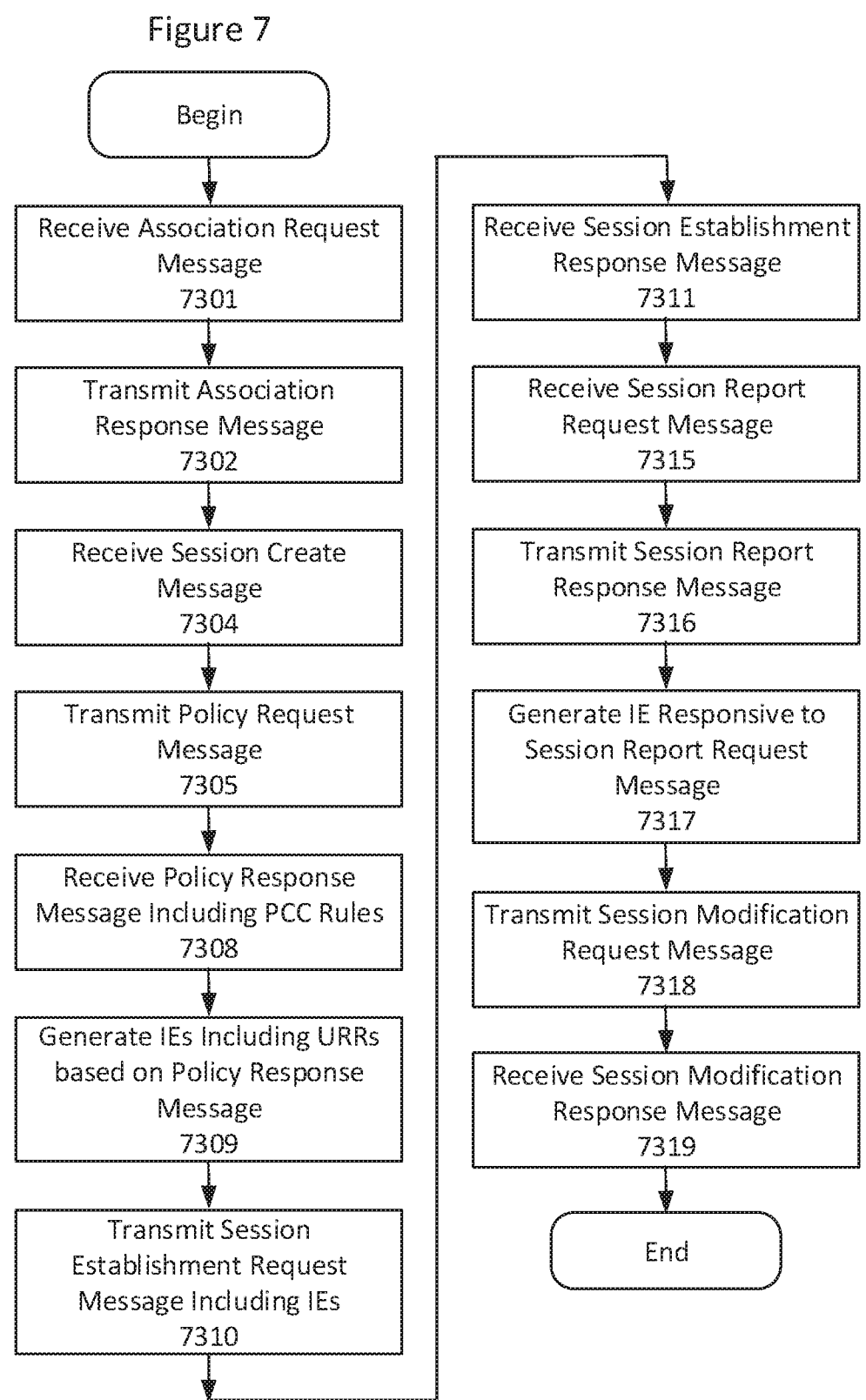

According to some embodiments of FIG. 7, the first CN node may be configured with a list of application Identifiers appIDs, generating the first information element may include generating the first information element including the first URR having the first URR identifier and including the first URR parameters associated with the first URR responsive to the first appID associated with the first PCC rule being included in the list of appIDs. Moreover, generating the second information element may include generating the second information element including the second URR having the second URR identifier without including the second URR parameters associated with the second URR responsive to the second appID associated with the second PCC rule being omitted from the list of appIDs. The first CN node may be configured with a threshold, and a number of the plurality of PCC rules associated with respective appIDs that are omitted from the list of appIDs may be greater than the threshold. Generating the second information element may include generating the second information element including the second URR having the second URR identifier without including the second URR parameters associated with the second URR responsive to the number of the plurality of PCC rules associated with the respective appIDs that are omitted from the list of appIDs being greater than the threshold and responsive to the second appID associated with the second PCC rule being omitted from the list of appIDs. Moreover, the list of appIDs may be a list of appIDs for frequently used applications.

According to some embodiments of FIG. 7, the first information element may include a first packet detection rule PDR based on the first PCC rule, the first PDR may define a detection rule for packets associated with the first application, the second information element may include a second PDR based on the second PCC rule, and the second PDR may define a detection rule for packets associated with the second application. For example, the first PDR may include the first appID, and the second PDR may include the second appID.

According to some embodiments of FIG. 7, the first information element may include a first forwarding action rule FAR based on the first PCC rule, and the first FAR may define a forwarding action for packets associated with the first application. Moreover, the second information element may include a second FAR based on the second PCC rule, and the second FAR may define a forwarding action for packets associated with the second application.

According to some embodiments of FIG. 7, the first information element may include a first Quality of Service Enforcement Rule QER based on the first PCC rule, the first QER may define an enforcement rule regarding Quality of Service for packets associated with the first application, and the second information element may be provided without a corresponding QER.

According to some embodiments of FIG. 7, the first CN node may be one of a Session Management Function SMF node, a PDN Gateway Control plane function PGW-C node, or a Traffic Detection Function Control plane function TDF-C node, and the second CN node may be one of a user plane function UPF node, a PDN Gateway User plane function PGW-U node, or a Traffic Detection Function User plane function TDF-U node.

According to some embodiments of FIG. 7, the first URR parameters associated with the first URR may include/define a charging rule associated with the first URR.

Various operations from the flow chart of FIG. 7 may be optional with respect to some embodiments of CN nodes and related methods. Regarding some embodiments of CN nodes and related methods, operations of blocks 7301, 7302, 7304, 7305, 7311, 7315, 7316, 7317, 7318, and/or 7319 of FIG. 7 may be optional.

Operations of a Core Network CN node 600 (implemented using the structure of FIG. 6) will now be discussed with reference to the flow chart of FIG. 8 according to some embodiments of inventive concepts. For example, modules may be stored in memory 605 of FIG. 6, and these modules may provide instructions so that when the instructions of a module are executed by respective CN node processing circuitry 603, processing circuitry 603 performs respective operations of the flow chart.

According to some embodiments at block 8301, processing circuitry 603 transmits (through network interface 607) an association request message to a second CN node, wherein the association request message includes an indication that the first CN node supports URR optimization and/or Quality Enforcement Rule QER optimization. Operations of block 8301 may be performed, for example, as discussed above with respect to operation 301 of FIG. 3A where the PFCP Association Request message is transmitted to the SMF node.

According to some embodiments at block 8302, processing circuitry 603 receives (through network interface 607) an association response message from the second CN node acknowledging the association request message of block 8301. Operations of block 8302 may be performed, for example, as discussed above with respect to operation 302 of FIG. 3A where the PFCP Association Response message is received from the SMF node.

According to some embodiments at bock 8310, processing circuitry 603 receives (through network interface 607) a session establishment request message from the second CN node. The session establishment request message is provided to establish a session for a communication device, and the session establishment request message includes a first information element associated with a first application having a first application identifier appID. The first information element includes a first Usage Reporting Rule URR having a first URR Identifier ID and includes first URR parameters associated with the first URR. The session establishment request message also includes a second information element associated with a second application having a second appID, and the second information element includes a second URR having a second URR identifier without including second URR parameters associated with the second URR (also referred to as a "light" URR). Operations of block 8310 may be performed, for example, as discussed above with respect to operation 310 of FIG. 3B where the PFCP Session Establishment Request message is received from the SMF node.

According to some embodiments at block 8311, processing circuitry 603 transmits (through network interface 607) a session establishment response message acknowledging the session establishment request message of operation 8310. Operations of block 8311 may be performed, for example, as discussed above with respect to operation 311 of FIG. 3B where the PFCP Session Establishment Response message is transmitted to the SMF node.

According to some embodiments at block 8312, processing circuitry 603 receives (through network interface 607) an application traffic packet from the communication device, wherein the application traffic packet is associated with the second application having the second appID. Operations of block 8312 may be performed, for example, as discussed above with respect to operation 312 of FIG. 3B.

According to some embodiments at block 8313, processing circuitry 603 detects that the application traffic packet of block 8312 matches the second appID corresponding to the second URR without the second URR parameters (also referred to as the "light" URR). Operations of block 8313 may be performed, for example, as discussed above with respect to operation 313 of FIG. 3C.

According to some embodiments at block 8314, processing circuitry 603 forwards (through network interface 607) the application traffic packet of block 8312 to an application server supporting the second application based on the second FAR. Operations of block 8314 may be performed, for example, as discussed above with respect to operation 314 of FIG. 3C.

According to some embodiments at block 8315, processing circuitry 603 transmits (through network interface 607) a session report request message to the second CN node responsive to receiving the application traffic packet associated with the second application having the second appID. The session report request message includes the second URR identifier and the second appID. Operations of block 8315 may be performed, for example, as discussed above with respect to operation 315 of FIG. 3C where the PFCP Session Report Request message is transmitted to the SMF node.

According to some embodiments at block 8316, processing circuitry 603 receives (through network interface 607) a session report response message from the second CN node acknowledging the session report request message. Operations of block 8316 may be performed, for example, as discussed above with respect to operation 316 of FIG. 3C where the PRCP Session Report Response message is received from the SMF node.

According to some embodiments at block 8318, processing circuitry 603 receives (through network interface 607) a session modification request message from the second CN node after transmitting the session report request message at block 8315 and after forwarding the application traffic packet to the application server supporting the second application at block 8314. The session modification request message includes a third information element associated with the second application having the second appID, and the third information element includes a third URR having the second URR Identifier and includes the second URR parameters associated with the third URR. Moreover, the session modification request message may be received without an FAR. Operations of block 8318 may be performed, for example, as discussed above with respect to operation 318 of FIG. 3D wherein the PFCP Session Modification Request message is received from the SMF node.

According to some embodiments, the second URR parameters associated with the third URR may include/define a charging rule associated with the third URR.

According to some embodiments at block 8319, processing circuitry 603 transmits (through network interface 607) a session modification response message acknowledging the session modification request message of block 8318. Operations of block 8319 may be performed, for example, as discussed above with respect to operation 319 of FIG. 3D.

According to some embodiments at block 8320, processing circuitry 603 stores the URR and/or the QER and applies the corresponding enforcement actions based on the session modification request message of block 318. Operations of block 8320 may be performed, for example, as discussed above with respect to operation 320 of FIG. 3D.

Figure 8:
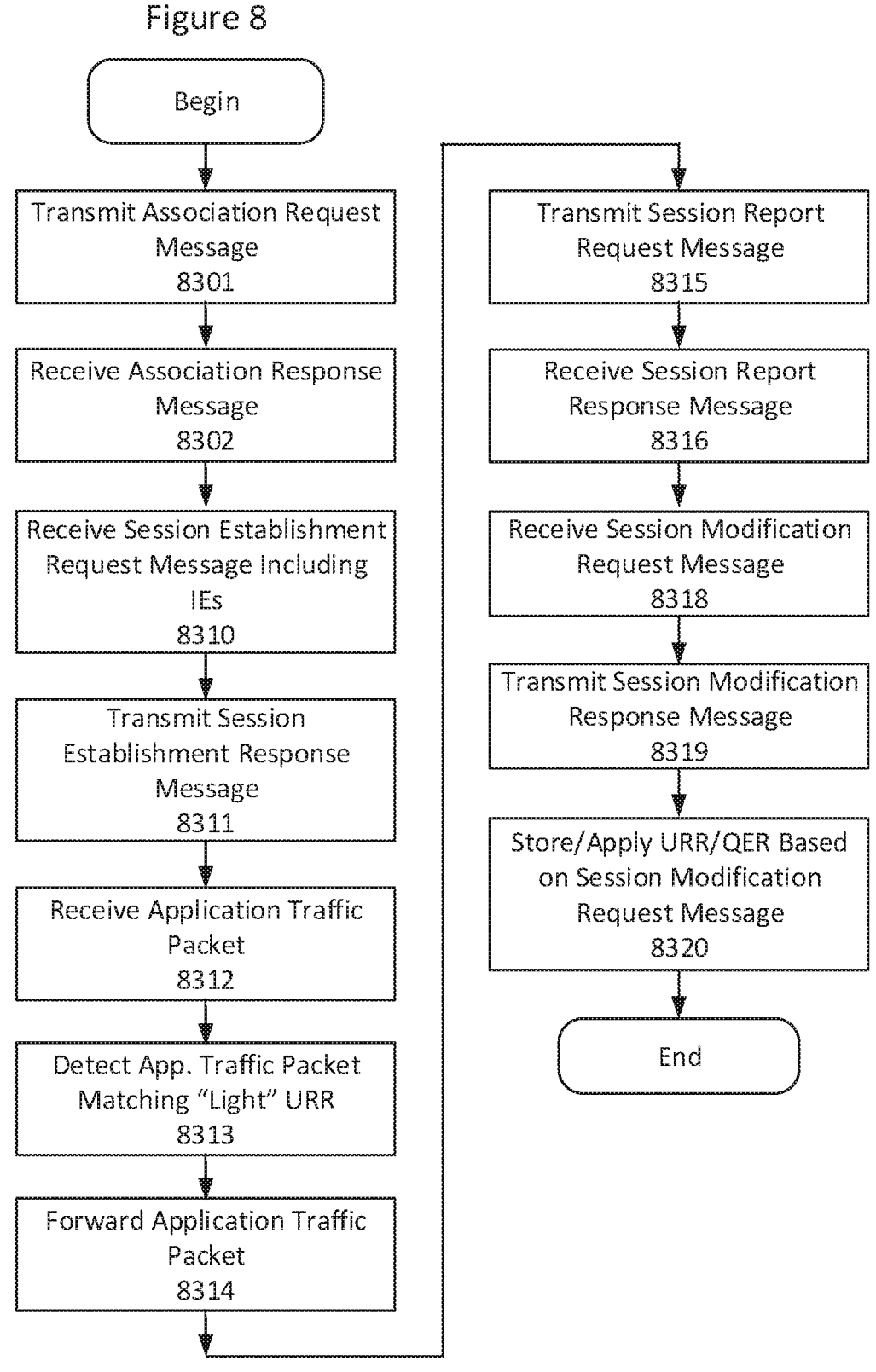

According to some embodiments of FIG. 8, the first information element of block 8310 may include a first packet detection rule PDR wherein the first PDR defines a detection rule for application traffic packets associated with the first application, and the second information element of block 8310 may include a second PDR wherein the second PDR defines a detection rule for application traffic packets associated with the second application. Moreover, the third information element of block 8318 may include the second PDR. In addition, the first PDR may include the first appID, and the second PDR may include the second appID.

According to some embodiments of FIG. 8, the third information element may include a Quality of Service Enforcement Rule QER, wherein the QER defines an enforcement rule regarding Quality of Service for packets associated with the second application, and the QER may be omitted from the second information element.

According to some embodiments of FIG. 8, the first information element may include a first packet detection rule PDR wherein the first PDR defines a detection rule for packets associated with the first application, and the second information element may include a second PDR wherein the second PDR defines a detection rule for packets associated with the second application. Moreover, the third information element may include the second PDR. Moreover, the first PDR may include the first appID, and the second PDR may include the second appID. In addition, the session report request message of block 8315 may be transmitted to the second CN node based on using the second PDR to identify the application traffic packet as being associated with the second application.

According to some embodiments of FIG. 8, the first information element includes a first forwarding action rule, FAR, wherein the first FAR defines a forwarding action for packets associated with the first application, wherein the second information element includes a second FAR, and wherein the second FAR defines a forwarding action for packets associated with the second application.

According to some embodiments of FIG. 8, the first information element of block 8310 may include a first Quality of Service Enforcement Rule QER wherein the first QER defines an enforcement rule regarding Quality of Service QoS for packets associated with the first application, and the second information element of block 8310 may be provided without a corresponding QER. Moreover, the third information element of block 8318 includes a second QER, wherein the second QER defines an enforcement rule regarding QoS for packets associated with the second application.

According to some embodiments of FIG. 8, the first CN node may be one of a user plane function UPF node, a PDN Gateway User plane function PGW-U node, or a Traffic Detection Function User plane function TDF-U node, and the second CN node may be one of a Session Management Function SMF node, a PDN Gateway Control plane function PGW-C node, or a Traffic Detection Function Control plane function TDF-C node.

According to some embodiments of FIG. 8, the first URR parameters associated with the first URR may include/define a charging rule associated with the first URR.

According to some embodiments of FIG. 8, the session report request message may include the second URR identifier, the second appID, and a start of traffic indicator.

Various operations from the flow chart of FIG. 8 may be optional with respect to some embodiments of CN nodes and related methods. Regarding some embodiments of CN nodes and related methods, operations of blocks 8301, 8302, 8311, 8313, 8314, 8316, 8319, and/or 8320 of FIG. 8 may be optional.

Operations of a Core Network CN node 600 (implemented using the structure of FIG. 6) will now be discussed with reference to the flow chart of FIG. 9 according to some embodiments of inventive concepts. For example, modules may be stored in memory 605 of FIG. 6, and these modules may provide instructions so that when the instructions of a module are executed by respective CN node processing circuitry 603, processing circuitry 603 performs respective operations of the flow chart.

According to some embodiments at bock 9305, processing circuitry 603 receives (through network interface 607) a policy request message from a second CN node. Operations of block 9305 may be performed, for example, as discussed above with respect to operation 305 of FIG. 3A where the Npcf Policy Request message is received from the SMF node.

According to some embodiments at block 9306, processing circuitry 603 transmits (through network interface 607) a policy profile request message to a third CN node responsive to receiving the policy request message from the second CN node, wherein the policy profile request message includes a subscriber identifier associated with the communication device. Operations of block 9306 may be performed, for example, as discussed above with respect to operation 306 of FIG. 3A where the UDR Policy Profile Request message it transmitted to the UDR node.

According to some embodiments at bock 9307, processing circuitry 603 receives (through network interface 607) a policy profile response message from the third CN node after transmitting the policy profile request message, wherein the policy profile response message includes subscriber profile information for the communication device having an indication to enable URR optimization and/or QER optimization. Operations of block 9307 may be performed, for example, as discussed above with respect to operation 307 of FIG. 3A where the UDR Policy Profile Response message is received from the UDR node.

According to some embodiments at block 9306, processing circuitry 603 transmits (through network interface 607) a policy response message to the second CN node responsive to receiving the policy request message and/or responsive to receiving the policy profile response message. The policy response message includes subscriber policy information for a communication device, and the subscriber policy information includes a plurality of Policy Charging and Control PCC rules for the communication device corresponding to a plurality of applications used by the communication device. Each of the plurality of applications has a respective application Identifier appID, and each of the PCC rules of the plurality of PCC rules is associated with a respective application of the plurality of applications and corresponding appID. The subscriber policy information includes an indication to enable URR optimization and/or Quality Enforcement Rule QER optimization for the PDU session. Moreover, the subscriber policy information may include the indication to enable URR optimization and/or QER optimization for the PDU session. Operations of block 9306 may be performed, for example, as discussed above with respect to operation 307 of FIG. 3A where the Npcf Policy Response message is transmitted to the SMF node.

According to some embodiments of FIG. 9, the first CN node may be one of a Policy Control Function PCF node or a Policy and Charging Rule Function node, the second CN node may be one of a Session Management Function SMF node, a PDN Gateway Control plane function PGW-C node, or a Traffic Detection Function Control plane function TDF-C node, and the third CN node may be a Unified Data Repository UDR node.

Various operations from the flow chart of FIG. 9 may be optional with respect to some embodiments of CN nodes and related methods. Regarding some embodiments of CN nodes and related methods, operations of blocks 9306 and/or 9307 of FIG. 9 may be optional.

Operations of a Core Network CN node 600 (implemented using the structure of FIG. 6) will now be discussed with reference to the flow chart of FIG. 10 according to some embodiments of inventive concepts. For example, modules may be stored in memory 605 of FIG. 6, and these modules may provide instructions so that when the instructions of a module are executed by respective CN node processing circuitry 603, processing circuitry 603 performs respective operations of the flow chart.

According to some embodiments at block 10306, processing circuitry 603 receives (through transceiver 607) a policy profile request message from a second CN node, wherein the policy profile request message includes a subscriber identifier associated with a communication device. Operations of block 10306 may be performed, for example, as discussed above with respect to operation 306 of FIG. 3A where the UDR Policy Profile Request message is received from the PCF node.

According to some embodiments at block 10307, processing circuitry 603 transmits (through transceiver 607) a policy profile response message to the second CN node responsive to receiving the policy profile request message. The policy profile response message includes subscriber profile information for the communication device, and the subscriber profile information includes an indication to enable usage reporting rule URR optimization and/or Quality Enforcement Rule QER optimization. Operations of block 10307 may be performed, for example, as discussed above with respect to operation 307 of FIG. 3A where the UDR Policy Profile Response message is transmitted to the PCF node.

According to some embodiments of FIG. 10, the first CN node may be a Unified Data Repository UDR node, and the second CN node may be one of a Policy Control Function PCF node or a Policy and Charging Rule Function PCRF node.

Various operations from the flow chart of FIG. 10 may be optional with respect to some embodiments of CN nodes and related methods.

Explanations are provided below for various abbreviations/acronyms used in the present disclosure.

| Abbreviation | Explanation |
| --- | --- |
| 4G | $4^{th}$ Generation |
| 5G | $5^{th}$ Generation |
| 5GC | $5^{th}$ Generation Core |
| AF | Application Function |
| AMF | Access and Mobility Management Function |
| API | Application Program Interface |
| AS | Application Server |
| CHF | Charging Function |
| CP | Control Plane |
| CUPS | Control Plane User Plane Separation |
| DL | Downlink |
| DPI | Deep Packet Inspection |
| FAR | Forwarding Action Rule |
| IE | Information Element |
| NEF | Network Exposure Function |
| OCS | Online Charging System |
| PCC | Policy and Charging Control |
| PCF | Policy Control Function |
| PCRF | Policy and Charging Rule Function |
| PDI | Packet Detection Information |
| PDN | Packet Data Network |
| PDR | Packet Detection Rule |
| PDU | Protocol Data Unit |
| PFCP | Packet Flow Control Protocol |
| PFD | Packet Flow Description |
| PGW | Packet Gateway |
| PGW-C | PDN Gateway Control plane function |
| PGW-U | PDN Gateway User plane function |
| QER | QoS Enforcement Rule |
| QoS | Quality of Service |
| RAN | Radio Access Network |
| SDF | Service Data Flow |
| SI | Service Information |
| SM | Session Management |
| SMF | Session Management Function |
| SUPI | Subscription Permanent Identifier |
| TDF-C | Traffic Detection Function Control plane function |
| TDF-U | Traffic Detection Function User plane function |
| TLS | Transport Layer Security |
| UDP | User Datagram Protocol |
| UDR | Unified Data Repository |
| UE | User Equipment |
| UL | Uplink |
| UP | User Plane |
| UPF | User Plane Function |
| URR | Usage Reporting Rule |

References are identified below.

[1] 3GPP TS 29.244 V16.3.1 (April 2020), Interface between the Control Plane and the User Plane nodes

[2] 3GPP TS 29.244 V16.1.0 (2019 September), Interface between the Control Plane and the User Plane Nodes; Stage 3 (Release 16)

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments and claims are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and claims and their equivalents, and shall not be restricted or limited by the foregoing detailed description.

The invention claimed is:

1. A method of operating a first core network (CN) node, the method comprising:

receiving a plurality of Policy Charging and Control (PCC) rules for a communication device corresponding to a plurality of applications used by the communication device, wherein each of the plurality of applications has a respective application Identifier (appID), wherein each of the PCC rules of the plurality of PCC rules is associated with a respective application of the plurality of applications and corresponding appID;

generating a first information element based on a first PCC rule of the plurality of PCC rules associated with a respective first application of the plurality of applications used by the communication device and a corresponding first appID, wherein the first information element includes a first Usage Reporting Rule (URR) having a first URR Identifier and including first URR parameters associated with the first URR;

generating a second information element based on a second PCC rule of the plurality of PCC rules associated with a respective second application of the plurality of applications used by the communication device and a corresponding second appID, wherein the second information element includes a second URR having a second URR identifier without including second URR parameters associated with the second URR; and transmitting a session establishment request message to a second CN node, wherein the session establishment request message includes the first information element including the first URR having the first URR Identifier and including the first URR parameters associated with the first URR and the second information element including the second URR having the second URR identifier without including the second URR parameters associated with the second URR.

2. The method of claim 1, further comprising:

receiving a protocol data unit (PDU) session create message requesting creation of a PDU session for the communication device; and transmitting a policy request message to a third CN node responsive to receiving the PDU session create message, wherein receiving the plurality of PCC rules comprises receiving a policy response message from the third CN node, wherein the policy response message includes subscriber policy information for the communication device, wherein the subscriber policy information includes the plurality of PCC rules, and wherein the policy response message corresponds to the policy request message.

3. The method of claim 2, wherein the subscriber policy information for the communication device includes an indication to enable at least one of URR optimization or Quality Enforcement Rule (QER) optimization for the PDU session, and wherein generating the second information element comprises generating the second information element including the second URR having the second URR identifier without including the second URR parameters associated with the second URR responsive to the subscriber policy information for the communication device including the indication to enable at least one of URR optimization or QER optimization for the PDU session.

4. The method of claim 2, wherein the third CN node comprises one of a policy control function (PCF) node or a Policy and Charging Rule Function (PCRF) node.

5. The method of claim 1, further comprising:

receiving an association request message from the second CN node, wherein the association request message includes an indication that the second CN node supports at least one of URR optimization or Quality Enforcement Rule (QER) optimization, wherein the session establishment request message is transmitted to the second CN node responsive to the association request message including the indication that the second CN node supports at least one of URR optimization or QER optimization.

6. The method of claim 1, further comprising:

receiving a session report request message from the second CN node after transmitting the session establishment request message, wherein the session report request message includes the second URR Identifier and the second appID;

generating a third information element based on the second PCC rule responsive to the session report request message including the second URR identifier, wherein the third information element includes a third URR having the second URR Identifier and including the second URR parameters associated with the third URR; and transmitting a session modification request message to the second CN node, wherein the session modification request message includes the third information element including the third URR having the second URR Identifier and including the second URR parameters associated with the third URR.

7. The method of claim 6, wherein the second URR parameters associated with the third URR comprise a charging rule associated with the third URR.

8. The method of claim 6, wherein the first information element includes a first packet detection rule (PDR) based on the first PCC rule, wherein the first PDR defines a detection rule for application traffic packets associated with the first application, wherein the second information element includes a second PDR based on the second PCC rule, wherein the second PDR defines a detection rule for application traffic packets associated with the second application, and wherein the third information element includes the second PDR.

9. The method of claim 8, wherein the first PDR includes the first appID, and wherein the second PDR includes the second appID.

10. The method of claim 6, wherein the third information element includes a Quality of Service Enforcement Rule (QER) based on the second PCC rule, wherein the QER defines an enforcement rule regarding Quality of Service for packets associated with the second application, and wherein the QER is omitted from the second information element.

11. A method of operating a first core network (CN) node, the method comprising:

receiving a session establishment request message from a second CN node, wherein the session establishment request message is provided to establish a session for a communication device, wherein the session establishment request message includes a first information element associated with a first application having a first application identifier (appID), the first information element including a first Usage Reporting Rule (URR) having a first URR Identifier and including first URR parameters associated with the first URR, and wherein the session establishment request message includes a second information element associated with a second application having a second appID, the second information element including a second URR having a second URR identifier without including second URR parameters associated with the second URR;

receiving an application traffic packet from the communication device, wherein the application traffic packet is associated with the second application having the second appID;

transmitting a session report request message to the second CN node responsive to receiving the application traffic packet associated with the second application having the second appID, wherein the session report request message includes the second URR identifier and the second appID; and receiving a session modification request message from the second CN node after transmitting the session report request message, wherein the session modification request message includes a third information element associated with the second application having the second appID, the third information element including a third URR having the second URR Identifier and including the second URR parameters associated with the third URR.

12. The method of claim 11, further comprising:

transmitting an association request message to the second CN node before receiving the session establishment request message, wherein the association request message includes an indication that the first CN node supports at least one of URR optimization or Quality Enforcement Rule (QER) optimization.

13. The method of claim 11, wherein the second URR parameters associated with the third URR comprise a charging rule associated with the third URR.

14. The method of claim 11, wherein the first information element includes a first packet detection rule (PDR) wherein the first PDR defines a detection rule for application traffic packets associated with the first application, wherein the second information element includes a second PDR, wherein the second PDR defines a detection rule for application traffic packets associated with the second application, and wherein the third information element includes the second PDR.

15. The method of claim 14, wherein the first PDR includes the first appID, and wherein the second PDR includes the second appID.

16. The method of claim 11, wherein the third information element includes a Quality of Service Enforcement Rule (QER), wherein the QER defines an enforcement rule regarding Quality of Service for packets associated with the second application, and wherein the QER is omitted from the second information element.

17. The method of claim 11, wherein the first information element includes a first packet detection rule (PDR), wherein the first PDR defines a detection rule for packets associated with the first application, wherein the second information element includes a second PDR, wherein the second PDR defines a detection rule for packets associated with the second application, and wherein the third information element includes the second PDR.

18. The method of claim 11, wherein the first information element includes a first forwarding action rule (FAR), wherein the first FAR defines a forwarding action for packets associated with the first application, wherein the second information element includes a second FAR, and wherein the second FAR defines a forwarding action for packets associated with the second application.

19. A method of operating a first core network (CN) node, the method comprising:

receiving a policy request message from a second CN node; and transmitting a policy response message to the second CN node responsive to receiving the policy request message, wherein:

the policy response message includes subscriber policy information for a communication device, the subscriber policy information includes a plurality of Policy Charging and Control (PCC) rules for the communication device corresponding to a plurality of applications used by the communication device, each of the plurality of applications has a respective application Identifier (appID), each of the PCC rules of the plurality of PCC rules is associated with a respective application of the plurality of applications and corresponding appID, the subscriber policy information includes an indication to enable at least one of Usage Reporting Rule (URR) optimization or Quality Enforcement Rule (QER) optimization for the PDU session, the first CN node is configured with a list of appIDs, a first information element is generated and the first information element comprises a first URR having a first URR identifier and including a first URR parameters associated with the first URR responsive to a first appID associated with a first PCC rule being included in the list of appIDs, and a second information element is generated and the second information element comprises a second URR having a second URR identifier without including a second URR parameters associated with the second URR responsive to a second appID associated with a second PCC rule being omitted from the list of appIDs.

20. A method of operating a first core network (CN) node, the method comprising:

receiving a policy profile request message from a second CN node, wherein the policy profile request message includes a subscriber identifier associated with a communication device; and transmitting a policy profile response message to the second CN node responsive to receiving the policy profile request message, wherein;

the policy profile response message includes subscriber profile information for the communication device, the subscriber profile information includes an indication to enable at least one of usage reporting rule (URR) optimization or Quality Enforcement Rule (QER) optimization, the first CN node is configured with a list of appIDs, a first information element is generated and the first information element comprises a first URR having a first URR identifier and including a first URR parameters associated with the first URR responsive to a first appID associated with a first PCC rule being included in the list of appIDs, and a second information element is generated and the second information element comprises a second URR having a second URR identifier without including a second URR parameters associated with the second URR responsive to a second appID associated with a second PCC rule being omitted from the list of appIDs.

* * * * *